April 14, 1959     R. B. COTTRELL     2,882,040

SNUBBER

Filed June 25, 1956

INVENTOR.
Robert B. Cottrell
BY Walter S. Schlegel, Jr.
Atty.

Witness:
Paul H. Gallagher

United States Patent Office 2,882,040
Patented Apr. 14, 1959

2,882,040

SNUBBER

Robert B. Cottrell, Deerfield, Ill., assignor to American Steel Foundries, Chicago, Ill., a corporation of New Jersey Application June 25, 1956, Serial No. 593,639

10 Claims. (Cl. 267—9)

The present invention relates to a snubber and more particularly a snubber especially adapted to railway freight cars.

An object of the invention is to provide a device of the foregoing general character of such construction as to substantially avoid synchronous vibrations therein.

Another and more specific object is to provide a snubber of the general character noted utilizing friction established between a resilient material such as rubber and a surface such as a smooth steel surface.

Still another object is to provide a snubber of the character noted utilizing friction between a resilient material and another surface, in which the resilient material is provided with a plurality of grooves and ribs for establishing a greater number of sliding surfaces.

A further object is to provide a unit snubber that may, as such unit, be used for replacing other snubbing and shock absorbing devices, such as spring group units.

A still further object is to provide a snubber of the general character noted which is simple and composed of a minimum number of parts and is extraordinarily rugged and strong.

Another object is to provide a snubber of the foregoing character, in which the resilient material and smooth surface are in the form of a plug-like element and a tubular casing surrounding it, in which pressure between the plug and casing is produced for providing friction and in which the snubbing action in the fore portion of the relative movement of the parts is produced by a normal friction established and in the latter portion the pressure is increased for increasing the friction and snubbing action.

Still another object is to provide a snubber embodying a plug and casing arrangement just noted, in which the plug and casing are of tapered shape whereby to provide progressively increased pressure and friction during the snubbing action.

Figure 1:
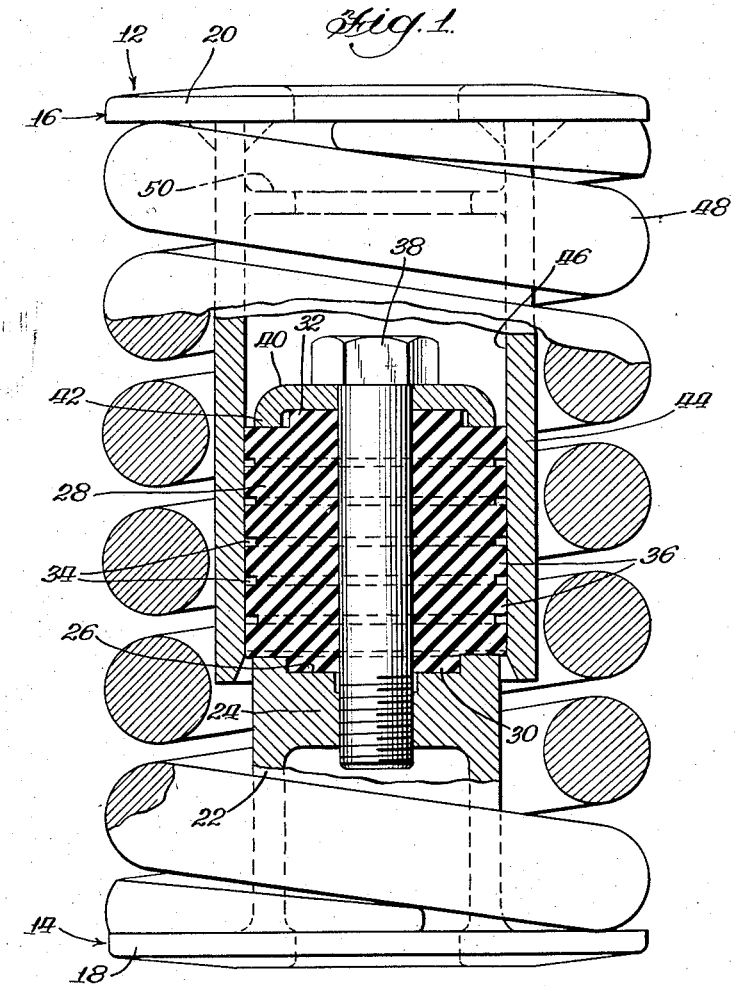
Figure 2:
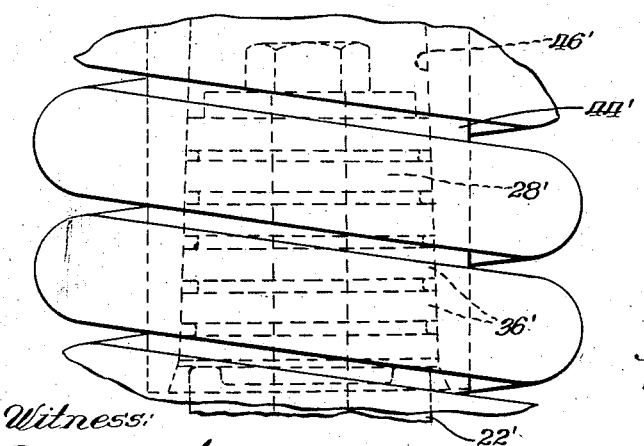

Other objects and advantages will appear from the following detailed description taken in conjunction with the accompanying drawings, in which:

Figure 1 is a side view of the snubber of the present invention partially in elevation and partially in section, and Figure 2 is a partial side elevational view of a modified form of the snubber.

Referring in detail to the drawings and particularly to Figure 1, showing the main embodiment, the device is identified as a whole by the numeral 12 and includes two main members 14 and 16, the first of which may be referred to as a base and the second as a cooperating member. These members are preferably each an integral or one piece element and made of suitable material, such as steel, but they may be made up each of several pieces, however, if such is desired. The base 14 includes an end plate 18 while the second member 16 includes an upper end plate 20, these end plates being of similar shape and having outer generally smooth and unobstructed surfaces whereby the snubber may be utilized for replacing a conventional spring in a railway car truck.

The base 14 includes a central projection 22 rising from the end plate 18, generally hollow to conserve material, and a top wall 24 having a recess 26 therein.

Mounted atop the projection 22 is a friction element 28 of resilient material, such as rubber or similar material, having the desired resiliency characteristics. This element is preferably in the form of a block or plug and in the present form is of generally cylindrical shape, having a boss 30 seated in the recess 26 and having a similar boss 32 on its upper end. This resilient element or plug 28 has a plurality of grooves 34 forming a plurality of axially spaced ribs 36. The plug 28 is only slightly greater in diameter than the projection 22 whereby it is provided with solid support by the latter. It is within the scope of the present invention to provide a plug having an unbroken peripheral surface without grooves and ribs. The plug is secured to the projection 22 by means of a stud bolt 38 extending through a central bore in the plug and threaded into the top wall of the base. A washer 40 serving as a thrust member is interposed between the head of the stud bolt and the plug, having a depending skirt or circumferential flange 42 forming a recess receiving the boss 32 of the plug. The stud bolt serves not only to secure the plug on the base but further compresses it in axial direction to expand it radially for a purpose to be described below.

The upper member 16 has a casing or sleeve 44 depending from the top end plate 20, having an open lower end receiving the plug 28 and having a polished steel inner surface 46 in frictional engagement with the plug. The inner diameter of the sleeve is slightly greater than the diameter of the projection 22 to enable the sleeve to pass readily over the projection in the movements of the two members toward and from each other. The stud bolt 38, in expanding the plug radially outwardly, as mentioned above, maintains constant frictional engagement between the plug and the inner surface of the sleeve 44. The upper member 16 assumes a normal position, such as shown in Figure 1, being biased to that position by a compression spring 48 interposed between the end plates 18 and 20 and surrounding the sleeve 44 and projection 22. In such normal position, the relation between the parts is that the plug 28 is disposed adjacent the lower end of the sleeve 44 to provide for maximum movement of the upper member 16 toward the base.

The construction above described provides for effective snubbing or absorbing action by the moving or sliding of a piece of resilient material under pressure over a smooth surface, such as steel. The snubbing action greatly reduces vibration. The construction above described constitutes a unit or self-contained device well adapted to substitute for other constructions now utilized.

It is, however, within the scope of the present invention to utilize the principles of the invention in a built-in construction.

The provision of the ribs 36 results in a plurality of sliding surfaces between the friction element or plug and the sleeve and is very effective. The provision of these ribs renders the plug more responsive to the compressional action of the stud bolt 38 in providing frictional engagement between the plug and the sleeve. However, a smooth surface friction element, that is, one without such grooves and ribs also provides effective snubbing action.

If desired, the sleeve 44 may be provided with an internal flange or rib 50, shown in dot-dash lines in Figure 1. This flange is so positioned in the sleeve that it engages the washer 40 adjacent the end of the movement of the upper member toward the base. This flange on so engaging the washer further compresses the plug 28 axially and expands it radially to increase the friction between the plug and sleeve and hence produces an intensified snubbing action.

The invention also encompasses a construction as shown in Figure 2. The device of Figure 2 includes a resilient element or plug 28' and an inner surface 46' of the sleeve 44' which are complementally tapered in upward direction. Because of such tapered shape, the friction between the plug and sleeve are progressively increased as the upper member is moved toward the base, as distinguished from uniform friction throughout the range of movement of the upper member toward the base. In the present embodiment, the resilient element or plug 28' may have a smooth outer surface without the ribs 36', but the provision of such ribs works toward a greater effective range of movement of the upper member toward the base.

I claim:

1. A snubber comprising a supporting and a supported member movable toward and away from each other, said supporting member having a base and a projection upstanding therefrom, a cavity disposed in the upper surface of said projection, a resilient member mounted atop said projection and having portions thereof disposed within and without said cavity, a washer atop said resilient member and having a peripheral flange extending towards said resilient member, said member having portions disposed within and without said flange, a stud engaging said washer and being threadably received in said projection, said supported member having a top plate and having a sleeve extending downwardly therefrom, said sleeve having a polished surface of steel engaging said resilient member, said stud retaining the washer in position on the member to compress the latter and expand it radially outward to maintain a constant coefficient of friction between said member and sleeve, and a spring surrounding said sleeve and projection and compressed between said base and top plate.

2. A snubber of the character disclosed comprising a base having a depression in the upper surface thereof, a friction element of resilient material substantially circular in cross section mounted on the base, said material having a portion thereof disposed in said depression, said material having a circumferential friction surface, a second member cooperable with and movable toward and from the base and including a sleeve receiving said friction element, said sleeve having an inner friction surface of polished steel engaging the circumferential friction surface of the friction element, and readily adjustable means mounted on the base serving to compress the friction element in axial direction and expanding it radially outwardly constantly into friction engagement with said sleeve, said means having a portion of said material disposed therein.

3. The invention of claim 2, in which the readily adjustable means includes a washer on the upper end of the friction element and a bolt engaging the washer and extending through the friction element and threaded into the base.

4. A snubber according to claim 1 wherein the sleeve comprises a rib disposed below the top plate and integral with said sleeve, said rib being engageable with said washer to provide an increasing coefficient of friction between said member and sleeve during movement of said supported member towards said supporting member.

5. A snubber of the character disclosed, comprising a base having a bottom plate and a central projection upstanding therefrom, the projection having a recess in its upper surface, a rubber plug mounted atop said projection with a boss fitted in said recess and having a boss also on its upper end, a washer atop said plug having a peripheral flange surrounding and receiving said upper end boss, a stud engaging said washer and extending through said plug and threaded in said projection, an upper member having a top plate and a central downwardly extending sleeve receiving said plug and having an inner surface of polished steel engaging said plug, said stud serving to retain the plug in position on said projection and to compress said plug axially to expand it radially into constant engagement with said sleeve, and a spring surrounding said sleeve and projection and compressed between said bottom plate and top plate.

6. A snubber of the character disclosed comprising a base having an upstanding projection, a friction element of resilient material mounted on said projection, an upper member having a sleeve receiving and frictionally engaging said friction element, said upper member having a predetermined range of movement toward and from said base, first pressure means secured to said base and constantly maintaining said friction element in constant friction engagement, said means maintaining a constant frictional force on said sleeve and constituting the sole means for this purpose in the fore part of the movement of the upper member toward the base, and means fixed on the sleeve engageable with the first pressure means when the upper member moves a predetermined distance towards the base, said sleeve means being effective to compress the friction element and increase the friction between the friction element and sleeve.

7. A snubber comprising a base having a depression on the upper surface thereof, a second member cooperable with and movable toward and from said base, a friction element having a boss mounted in said depression and being in the form of a plug of resilient material, said second member having a sleeve receiving said plug in sliding friction engagement, said friction element and sleeve being of cylindrical shape, and pressure means expanding the friction element outwardly into constant friction engagement with the sleeve, said pressure means having a depression on the lower surface thereof, a boss disposed on the upper surface of said element, said last-mentioned boss being disposed in said last-mentioned depression.

8. A snubber comprising a base, a second member cooperable with and movable toward and from said base, a friction element mounted on said base and being in the form of a plug of resilient material, said second member having a sleeve receiving said plug in sliding friction engagement, said friction element and sleeve being complementally tapered in upward direction, spring means engaging the base and second member for biasing the base and member apart, and pressure means for compressing the friction element in axial direction and expanding it radially for friction engagement with the sleeve.

9. A snubber comprising a base, a second member cooperable with and movable toward and from said base, a friction element mounted on said base and being in the form of a plug of resilient material, said second member having a sleeve receiving said plug in sliding friction engagement, said friction element and sleeve being complementally tapered in upward direction and the friction element having grooves forming a plurality of axially spaced circumferential ribs on its peripheral surface, pressure means expanding the friction element radially outwardly into constant friction engagement with the sleeve, and spring means engaging the base and second member for biasing the base and second member away from each other.

10. A snubber of the character disclosed comprising a pair of members movable toward and away from each other and each having an end plate, the axially outer surfaces of the end plates being generally smooth and unobstructed whereby the snubber may be substituted for a standard spring in a railway car truck, said members axially inwardly of said end plates being of reduced dimension whereby the end plates form flanges, a compression spring between said flanges and biasing said members apart, one of said members constituting a base and having a central projection rising from its end plate and having a recess in its top surface, a resilient plug of slightly greater diameter than the projection mounted atop the projection with a boss seated in said recess, means securing said plug to the projection, said plug having a plurality of axially spaced circumferential ribs, the other of said members having a depending sleeve receiving said plug and with a polished steel inner surface frictionally engaging said plug, said securing means compressing said plug radially outwardly into constant friction engagement with said sleeve.

References Cited in the file of this patent

UNITED STATES PATENTS

| | | |
|---|---|---|
| 1,835,013 | Chryst | Dec. 8, 1931 |
| 2,010,623 | Bugatti | Aug. 6, 1935 |
| 2,263,599 | Tucker | Nov. 28, 1941 |
| 2,447,368 | Schlegel et al. | Aug. 17, 1948 |
| 2,484,750 | Schlegel | Oct. 11, 1949 |

FOREIGN PATENTS

| | | |
|---|---|---|
| 1,054,004 | France | Oct. 7, 1953 |